INVENTORS
GERALD GOLDEN
CHARLES V. WROBEL, JR.

United States Patent Office 3,186,254
Patented June 1, 1965

3,186,254
BICYCLE PEDAL CONSTRUCTION
Gerald Golden, Highland Park, and Charles V. Wrobel, Jr., Arlington Heights, Ill., assignors to Excel, Inc., Franklin Park, Ill., a corporation of Illinois
Filed Apr. 24, 1962, Ser. No. 189,796
3 Claims. (Cl. 74—594.4)

This invention relates to improvements in bicycle pedals and more particularly relates to an improved form of bicycle pedal in which the pedal block and mounting therefor is of a simplified construction.

A principal object of the present invention is to improve upon the bicycle pedals heretofore in use by providing a simple and novel form of pedal block construction and mounting therefor.

A further object of the invention is to provide an improved form of bicycle pedal construction particularly adapting the pedal to utilize plastic pedal blocks.

A still further object of the invention is to simplify the construction of the bicycle pedals heretofore in use, by using a pressed or stamped pedal frame connected to the hub of the pedal by crimping and by providing hollow pedal blocks carried directly by the pedal frame.

A still further object of the invention is to provide a bicycle pedal of a simplified and improved construction in which the pedal frame is particularly adapted for directly carrying hollow plastic pedal blocks incorporated in the pedal assembly as a part of the frame.

Still another object of the invention is to provide an improved form of pedal block adapted to be made from plastic or a like material and so constructed as to be capable of being mounted on the pedal frame without the necessity of providing the mounting bolts for the pedal blocks previously required.

A still further object of the invention is to simplify the construction of bicycle pedals by making the pedal block from plastic having a generally rectangular hollow interior portion capable of being slipped directly on the pedal frame supports therefor.

These and other objects of the invention will appear from time to time as the following specification proceeds and with reference to the accompanying drawings wherein.

Figure 1:
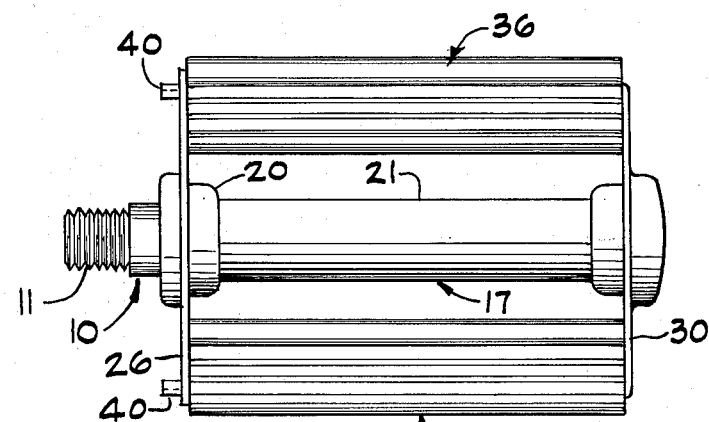
FIGURE 1 is a plan view of a bicycle pedal constructed in accordance with the principles of the present invention.
Figure 2:
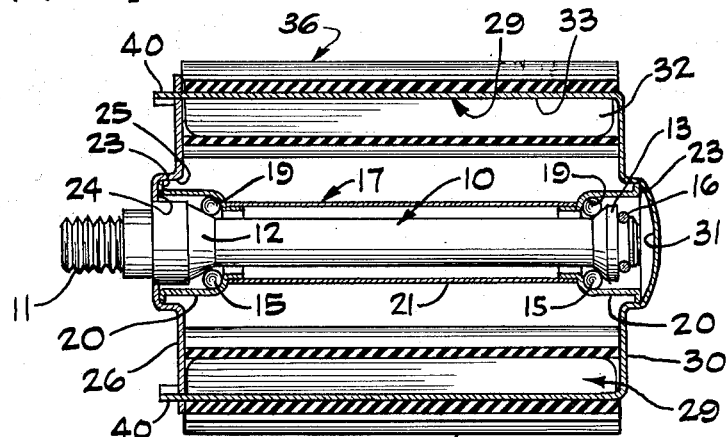
FIGURE 2 is a horizontal sectional view taken through the bicycle pedal shown in FIGURE 1.

In the embodiment of the invention illustrated in the drawings, we have shown a pedal support or crank shaft 10 having a threaded inner end portion 11 adapted to be threaded on a crank arm for rotatably driving a bicycle sprocket.

The crank shaft 10 has cones 12 and 13 thereon adjacent opposite ends thereof and forming the inner races for ball bearings 15. The outer cone 13 is shown as being held in position as by a snap ring 16.

A hub 17 is rotatably mounted on the crank shaft 10 on the ball bearings 15 and has internal races 19 formed integrally therewith at opposite ends thereof and forming internal bearing races for the ball bearings 15. The internal races 19 are formed by generally bell-shaped portions 20 flared outwardly of opposite ends of a sleeve like portion 21 of the hub 17, and having radially extending flanges 23 extending radially outwardly of the outer end portions of said bell-shaped portions.

The inner flange 23 abuts an annular surface 24 defining the inner margin of a recessed portion 25 of a cross member or bar 26, and is welded or otherwise secured to said annular surface. The cross bar 26 has slots 27 at opposite ends thereof (FIGURE 3) forming a means to accommodate pedal block supports 29 to be crimped thereto, as will hereinafter more clearly appear as the specification proceeds.

A cross bar 30 at the opposite end of the hub from the cross bar 26 has an inwardly dished portion 31 receiving the flange 23. The cross bar 30 also has the pedal block supports 29 formed integrally therewith, and extending at right angles with respect thereto. The cross bar 30 and pedal block supports 29 may be a stamping. The pedal block supports 29 are shown as being of a generally channel like form having parallel spaced flanges 32 extending from an outer web 33.

The flanges 32 and the web 33 thus form a generally rectangular open support along which the hollow interior portion 35 of a pedal block 36 may be slipped in assembling the pedal.

Figure 3:
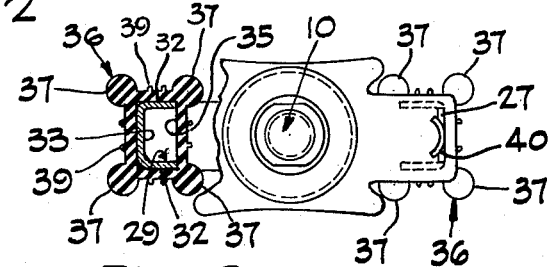
FIGURE 3 is an end view of the bicycle pedal looking at the pedal from the inner end thereof, with parts of the pedal broken away and the block and its support shown in transverse section.

The pedal blocks 36 are preferably made from a plastic material, which may be a nylon plastic material or any other suitable plastic and may even be made from rubber or from one of the well known substitutes for rubber. Each pedal block 36 is shown in FIGURES 1 and 3 as having generally circular beads 37 extending therealong the corners thereof and as having ribs 39 extending along said pedal blocks between said beads. The beads 37 and ribs 39 are formed to provide a gripping means for the foot, and may be of various desired forms.

In assembling the bicycle pedal, assuming the hub 17 is journalled on the crank shaft 10 and the pedal block supports 29 are bent at right angles with respect to the cross bar 30, the pedal blocks 36 are first slipped along the channeled portions of the pedal block supports 29 into engagement with the innerside of the cross bar 30. Tangs 40 extending from the webs 33 of the channels 29 are then placed through the slots 27 and the dished portion 31 is brought into firm engagement with the flange 23 of the outer bell-shaped portion 20.

With the flange 23 in firm engagement with the dished portion 31 the tangs 40 are then bent to the arcuate form shown in FIGURE 3, with opposite end portions thereof in engagement with the outer face of the cross bar 26, to hold the bicycle pedal in assembled relation.

It may be seen from the foregoing that a simplified form of bicycle pedal construction has been provided, eliminating the usual nuts and bolts for holding the pedal blocks in position, and utilizing rectangular supports crimped to the inner cross member of the pedal as the support means for the pedal blocks.

It may further be seen that the bicycle pedal construction shown and described is particularly adapted for supporting hollow pedal blocks made from plastic, or a like durable and relatively inexpensive material.

While we have herein shown and described one form in which our invention may be embodied, it may readily be understood that various variations and modifications in the invention may be attained without departing from the spirit and scope of the novel concepts thereof as defined by the claims appended hereto.

We claim as our invention:
1. A bicycle pedal construction, comprising
 a pedal shaft,
 a hub rotatably mounted on said pedal shaft,
 a cross bar extending from one end of said hub,
 a second cross bar extending from the opposite end of said hub,
 pedal block supports formed integrally with one of said cross bars and channel-like in cross section and extending from the associated cross bar at right angles with respect thereto to the other of said cross bars, pedal blocks having hollow interior portions conforming in form to said pedal block supports and mounted on said supports by slidable movement therealong and solely supported on said supports, means crimped to said supports and to the other of said cross bars.

2. In a bicycle pedal construction, a pedal shaft, a hub rotatably mounted on said pedal shaft, a cross bar secured to one end of said hub and extending from opposite sides thereof, an opposite cross bar abutting the opposite end of said hub, channel like supports extending from the opposite cross bar in parallel relation with respect to each other toward said first mentioned cross bar, hollow pedal blocks mounted on said supports by slidable movement therealong and retained from turning movement with respect to said supports by the form of said supports, and means bringing said opposite cross bar into firm engagement with said hub comprising tangs extending from said supports through said first mentioned cross bar and crimped to said supports to said first mentioned cross bar and to thereby retain the pedal in assembled relation.

3. In a bicycle pedal construction, a pedal shaft, a hub concentric with said pedal shaft, anti-friction bearings rotatably mounting said hub on said pedal shaft, said hub having radial flanges at each end thereof, a first cross bar having a central dished portion having one of said flanges extending therein and secured thereto, said cross bar extending to opposite sides of said hub and having slots therein at the outer end portions thereof, a second cross bar having a central dished portion for receiving the other of said flanges, channel like supports extending from said second cross bar along opposite sides of said hub, tangs projecting from the outer ends of said supports for registry with said slots in said first cross bar, pedal blocks having hollow interior portions conforming to said supports and mounted on said supports by slidable movement therealong and retained from turning movement with respect to said supports by the form of said supports, said tangs being crimped over the outer side of said first cross member and retaining said second cross member to the associated flange of said hub and thereby retaining the pedal in assembled relation.

References Cited by the Examiner

UNITED STATES PATENTS

| | | | |
|---|---|---|---|
| 527,520 | 10/94 | Copeland | 74—594.4 |
| 2,399,888 | 5/46 | Persons | 74—594.4 |
| 2,731,854 | 1/56 | Pawsat | 74—594.4 |

FOREIGN PATENTS 1,069,951    2/54    France.

BROUGHTON G. DURHAM, *Primary Examiner.*